April 4, 1939.   J. A SMITH   2,153,053
GLOBE
Filed Nov. 22, 1937
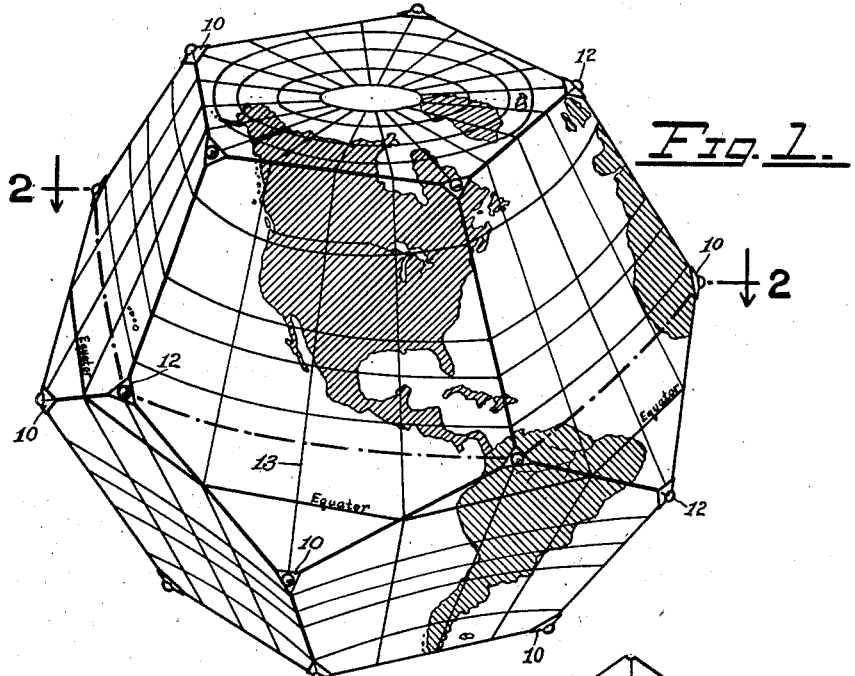
Fig. 1.
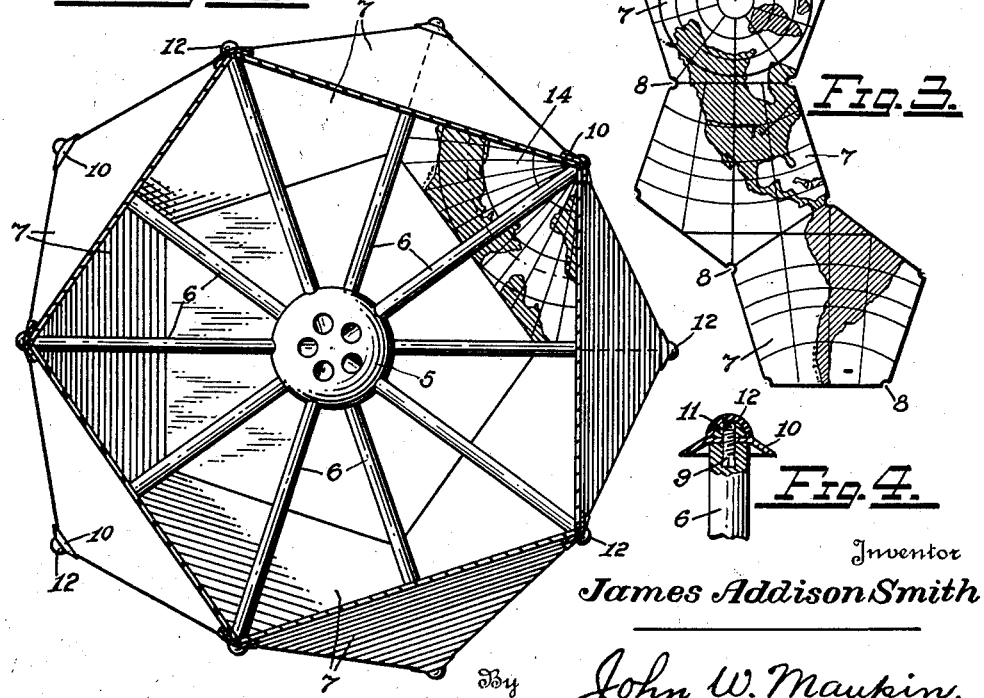
Fig. 2.
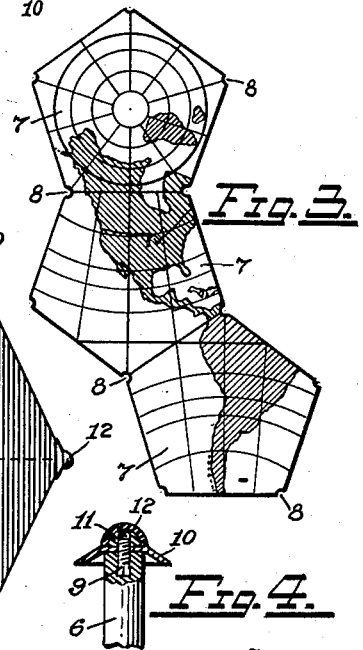
Fig. 3.
Fig. 4.
Inventor
James Addison Smith
By John W. Maupin
Attorney Patented Apr. 4, 1939

2,153,053

UNITED STATES PATENT OFFICE 2,153,053

GLOBE

James Addison Smith, Seattle, Wash.

Application November 22, 1937, Serial No. 175,895

3 Claims. (Cl. 35—46)

My invention relates to globes, and more particularly to an approximate globe comprising twelve equal flat pentagonal sides that are detachably mounted on a collapsible frame in the form of a regular dodecahedron. Each of these pentagonal sides represents one-twelfth of the earth's surface and has a geographical projection, preferably of the gnomonic type, comprising meridians of longitude and parallels of latitude, drawn thereon and whereby the different continents, countries and other geographical features are readily depicted.

Important objects in making the sides pentagonal in shape are that the pentagon is peculiarly adapted to the use of the gnomonic projection, and, when the twelve pentagonal sides are assembled in the form of a dodecahedron, this form is the most practical approach to a sphere for geographical purposes by reason of its having a sufficient, but not an excessive, number of sides that are of ample area and shape for illustration of the universal geographical features.

Since the gnomonic projection is based upon a system wherein the plane of projection is tangent to the sphere at some given point, with the eye of the projector located at the center of the sphere, it follows that each of the pentagons constitutes a plane of projection with its center forming the tangential point. Furthermore, the eye being at the spherical center and hence in the plane of every great circle, it follows that all great circles are projected as straight lines, including not only the meridians and the equator but the five sides of each flat pentagon and the line between any two given points on the pentagons. In the use of the pentagons, the meridians are drawn as straight lines that are symmetrically disposed with respect to the five sides and corners of each pentagon, the twelve pentagons are assembled together in the form of a dodecahedron with the ends of each parallel of latitude coinciding at the edges of each pentagon, and the different countries and other physical features are portrayed thereon without appreciable or material distortion.

The device is primarily intended for educational purposes and for use by pupils in school or children at home. The objects in making the twelve pentagonal sides flat and detachable are that pupils may personally assemble and disassemble them and thus more readily learn the relationship between flat and globular maps, the reasons for unavoidable distortion in flat maps, the rapid increase in such distortion proportioned upon the increase in the area of the maps, and the different appearance of geographical areas as compared with other systems or projections. The pupils may also place the pentagonal sides on a flat surface and study them separately, or in groups as shown in Fig. 3 of the drawing, and in geographical sequence with their edges placed together to show the continuity of the different countries as will be understood.

The objects in detachably mounting the flat pentagonal sides on a frame that is collapsible and detachable are that the entire globe may be readily taken apart and stored or shipped in compact form. Printing of the projections and geographical features may be done more accurately and at less cost on the flat pentagonal surfaces than could be done on any warped or curved surface. In fact the entire globe may be made at a cost that is sufficiently small as to enable each pupil in a school room to be provided with one for individual use and study.

In the drawing:

Figure 1 is a perspective view of a globe constructed in accordance with the invention;

Fig. 2 is a view in horizontal section taken substantially on a broken line 2—2 of Fig. 1;

Fig. 3 is a plan view showing a group of the flat pentagonal sides placed edge to edge in geographical sequence; and Fig. 4 is a detail view in vertical section showing a means for detachably connecting the flat pentagonal sides to the collapsible frame.

Referring now in detail to the drawing wherein like reference numerals indicate like parts in the several views, the numeral 5 designates a central ball, made of wood or other light material, and which may form the hub or nucleus of the frame. A plurality of equal arms 6 are each detachably socketed into the hub ball 5 in equally spaced apart radial relation. There are twenty of these arms all diverging from the common center and terminating at equidistant points therefrom, and also at points that are equally distant apart. These terminal points form the bearings for the flat pentagonal sides as hereinafter set forth.

Each of the twelve flat pentagonal sides is designated by the numeral 7. When these pentagonal sides are all placed together to form a dodecahedron, each of their five edges coincides with the corresponding edges of the adjacent pentagonal sides, and each of their five corners is juxtaposed with a corner of each of the adjoining pentagonal sides, thus forming the twenty points of the dodecahedron in juxtaposed groups of three corners each. The pentagonal sides are so proportioned that these twenty points of the dodecahedron register centrally with the ends of the frame arms 6. Each of the five corners of the pentagonal sides 7 may be slightly cut away as shown at 8 in Fig. 3 for reasons presently apparent.

The means for detachably securing the three juxtaposed corners of the pentagons to the ends of the twenty radial arms 6 to form the twenty points of the dodecahedron may consist first of a stud-screw 9 imbedded into the ends of said arms with its threaded end projecting exteriorly thereof, as shown in Fig. 4. Three of the flat pentagonal sides 7 are then fitted onto the collapsible frame with a cut-away corner 8 of each bearing against one of the stud-screws 9 to form one of the points of the dodecahedron. A small triangular plate 10 is then placed against this point with the screw 9 projecting through a hole in its center. These small plates are triangularly concave to fit the three ridges of the dodecahedron point and to thus form a snug connection. A nut 11 may then be threaded onto the projecting end of the stud-screw, and this nut may have a rubber or other soft covering 12 forming a cushion for obvious reasons. All twelve of the pentagonal sides may be readily secured to the frame by the foregoing described means.

As previously stated, the flat pentagonal sides 7 are particularly adapted to the use of the gnomonic projection. This is apparent from an inspection of Fig. 1 wherein the center meridian, as designated by the numeral 13, extends in a straight line from one corner of a pentagon to the central point of its opposite edge, and this same meridian extends in coincidence with the ridge formed by the two abutting edges of the adjoining pentagonal sides. This holds true for all ten of the pentagonal sides which collectively form the side wall of the dodecahedron. The two opposite and lateral edges of each pentagon also constitute meridians, and a meridian may be interposed proportionally between these edge meridians and the aforesaid central meridian thus dividing each pentagon into four parts. There being five pentagons forming a belt around the dodecahedron, this arrangement divides the dodecahedron into twenty equal parts with twenty meridians forming the north and south dividing lines between them, and eighteen degrees of longitude between each of said meridians. It will now be apparent that the combination of the pentagonal sides forming the dodecahedron together with gnomonic projections thereon is an important feature of the invention.

From the foregoing, it will be seen that the projections on the ten pentagons forming the side wall of the dodecahedron are all printed or drawn alike. The other two pentagons form the north and south polar regions respectively, and their projections are also alike on each. On said two projections, the meridians converge from the ends of the meridians on the ten side pentagons to the north and south poles. The parallels of latitude, not being great circles, are of course curved concentrically with said poles. It will be noted in Fig. 2 that the same symmetrical arrangement of the gnomonic projection lines may be followed out when using one of the twenty points of the dodecahedron as a pole instead of using the centers of pentagons as such.

It will be noted that projections and maps may be printed on both sides of the pentagons as well as on their outsides, as shown at 14 in Fig. 2. While the device is not absolutely limited to the use of the gnomonic projection, same or some slight modification thereof is preferable to the mercator, polyconic and other forms of projection in using the dodecahedron as a globe as hereinbefore set forth. Political as well as physical maps may be shown on the pentagons comprising the dodecahedron, and a heavenly chart may also be made, showing the heavenly bodies projected against the vault. It will be particularly observed that semi-portions of a globe may be formed with my device by using only a part of the frame and sides, such as a hemisphere by using ten of the radial arms 6 and six of the pentagonal sides 7. The device is not limited to the exact frame or securing means shown in the drawing, as for instance, a detachable external frame could be conveniently used on large globes.

While I am aware that maps have heretofore been made on solid multi-sided figures, and on spherical figures with irregular sections of their outer shell outlining countries, states and the like made in detachable form, I am not aware that an approximate globe has heretofore been made with flat detachable sides that are of equal size and symmetrical shape and peculiarly adapted to the use of the gnomonic projection. Having thus described my invention, what I claim and desire to secure by Letters Patent of the United States is:

1. An approximate globe comprising a collapsible frame, twelve flat pentagonal sides, means for detachably connecting the twelve sides to the frame to form a dodecahedron, and a universal map shown on the globe with each component part thereof appearing upon the respective sides in geographical sequence.

2. An approximate globe comprising a collapsible frame, said frame consisting of twenty equal arms radiating equally from a common center to form the outline of a dodecahedron, means for detachably securing the arms at the center of the globe, twelve flat pentagonal sides connected to the frame to form a dodecahedron, means for detachably connecting the corners of the pentagonal sides to the outer ends of the arms, and a universal map shown on the twelve pentagonal sides with each component part of the map appearing upon the respective sides in geographical sequence.

3. An approximate globe comprising a collapsible frame, twelve flat pentagonal sides, means for detachably connecting the twelve sides to the frame to form a dodecahedron, a universal gnomonic projection shown on the dodecahedron with each component thereof appearing upon the respective twelve pentagonal sides, and a universal map shown on the dodecahedron with each of its component parts appearing upon the respective pentagonal sides in geographical sequence.

JAMES ADDISON SMITH.